June 11, 1940.  R. F. O. LEVIN  2,204,315
ELECTRICAL ROUTE INDICATOR
Filed Feb. 26, 1937
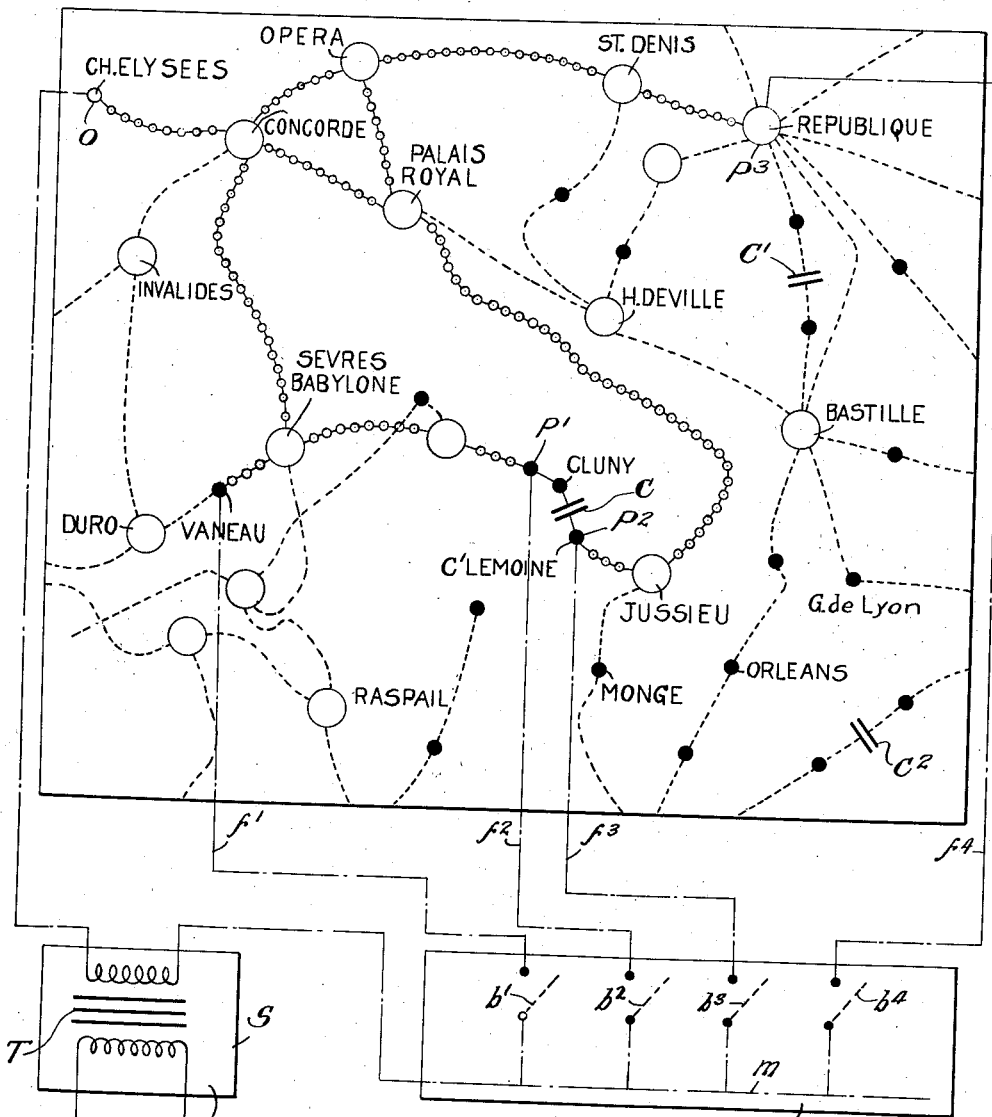
Constant Current Transformer
Inventor.
Remy F. O. Levin,
By Smith, Michael & Gardiner,
Attorneys.

Patented June 11, 1940

2,204,315

UNITED STATES PATENT OFFICE 2,204,315

ELECTRICAL ROUTE INDICATOR

Rémy Félix Olivier Levin, Paris, France, assignor to Compagnie du Chemin de Fer Metropolitain de Paris, Paris, France, a joint-stock company of France Application February 26, 1937, Serial No. 128,022
In France February 29, 1936

2 Claims. (Cl. 177—311)

The present invention relates to electrical route indicators, and has for its object to provide a plan, diagram or model in two or in three dimensions of an installation or work of any kind, such as a transport system, road system, exhibition, building, or the like, comprising any number of individual points and the corresponding routes, and to indicate upon this plan or model the position of any one destination point, as well as the shortest or quickest itinerary or the one considered as the best for reaching this point from a starting point, whether belonging to or external of the system, the plan or model being installed at this starting point. In the present specification the term "route" is employed to designate an established service line, such as a fixed car route or railroad service, whereas the term "itinerary" is employed to mean an actual line of travel from a starting point to a destination; a selected itinerary may thus comprise contiguous sections of two or more routes.

The invention is hereafter described with reference to the accompanying drawing in which I have illustrated a preferred embodiment of my invention and in which I have shown a partial plan view of a map of the "Chemin de Fer Metropolitain de Paris" transportation system.

The following considerations and methods have governed the conception of the improved electrical route indicator (the explanation given for a plan in two dimensions would apply also for a model in three dimensions):

All the routes forming the system shown in the accompanying drawing are represented by one or more electrical conductors with interconnections at the crossing points, in such a way that if a difference of potential is applied between a point O (Ch. Elysees) and any other point of the system shown, currents will be able to circulate in the several paths which allow of travel from O to point P (Vaneau), point P' (Cluny), point $P^2$ (C'Lemoine), point $P^3$ (Republique), etc.

In order that the current may traverse only a single preselected path between O and one of the selected points P, P', $P^2$, $P^3$, etc., all the undesirable branch circuits must be eliminated, by interrupting the conductors at methodically selected positions.

While there may be several available routes between the starting point O and any of the points P, P', $P^2$, $P^3$, etc., there is always one preferred itinerary, for example, if there be considered the routes available between O (Ch. Elysees) and a station P' (Cluny), there is one route which will pass through Concorde, Palais Royal, Jussieu and C'Lemoine, and another route which will pass through Concorde and Sevres Babylone. If the route between O (Ch. Elysees) and point P' (Cluny) via Concorde and Sevres Babylone has been determined to be the preferred itinerary, the circuit between point P' (Cluny) and point $P^2$ (C'Lemoine) will be interrupted at a point $c$. Similar points of interruption of the circuits are shown at $c'$ and $c^2$, these interruptions being located where necessary to accomplish the desired results.

Likewise certain crossings or change points might never be utilized for journeys starting from O. At these points, the crossing circuits will not be interconnected electrically.

The positions of all the interruptions $c$, $c'$, $c^2$, etc., are analogous with the watershed ridges in hydrography. The system is thus decomposed into a certain number of sections analogous with river basins, in which the rivers (with tributaries, sub-tributaries, etc.) all converge to the starting point O.

A similar reasoning for a three-dimension model (for example: the model of a building with its doors, staircases, corridors, halls, etc.) would have led to decomposing the circuits into trees with branches of various orders.

It will now be understood that by reason of this method of sectioning, if a difference of potential is applied between the point O and any point P, P', $P^2$ or $P^3$ of the system, only the itinerary predetermined as being that to be utilized for going from O to P, P', $P^2$ or $P^3$, respectively will be traversed by a current.

Any electrical visual indicators or display devices (lamps, pilot discs, signals, etc.) mounted in series along this route allow of marking the destination point as well as of tracing out the said itinerary and rendering it visible upon the plan or model.

The sectioning allows very simple mounting, the same electrical display device being able to serve for marking a particular point whatever be the route on which it lies; however, at the crossing point, the number of these display devices can be equal to the number of circuits which cross.

In practice, the electrical route indicator with itinerary finder according to the invention will comprise:

(1) A plan (or a model) equipped as has been explained with the circuits sectioned off as a function of the position of the starting point, for example this point lies at the point O belonging to the system. If it is external of the system, the sectioning will be effected by considering the starting point as a supplementary imaginary point and connecting it in thought to the nearest point (or to the several nearest points) belonging to the system.

(2) A control panel M of any kind (desk, board, etc.) with the list (alphabetical or other) of the points or stations of interest.

(3) A source of current S, preferably of constant intensity, adapted to furnish the required voltages.

(4) Connections between the control panel and the plan by means of one lead at most per point or station of the plan and a common return lead $r$ running from the starting point such as O.

The control panel comprises suitable devices allowing of applying a suitable voltage, by means of the source of current S, to the lead corresponding to the station on the plan of which it is desired to know the position and itinerary; for example the lead $f'$ for the point P (Vaneau), the itinerary OP represented in chain-like lines is then rendered visible, this visible line indicating the preferred itinerary which passes through Concorde and Sevres Babylone, it having been determined that this route constitutes the best or most convenient itinerary as compared with the route passing through Concorde, Invalides and Duro. Due to the circuit interrupter $c$, the current cannot pass from P' (Cluny), $P^2$ (C'Lemoine), Jussieu, Palais Royal, Concorde to O (Ch. Elysees) and must pass from P' (Cluny) through Sevres Babylone and Concorde to O (Ch. Elysees).

In the construction represented diagrammatically in the single figure of the accompanying drawing, the source of current S is connected by a common return conductor $r$ to the starting point O (Ch. Elysees), and also to the panel M from which separate conductors $f'$, $f^2$, $f^3$ and $f^4$ controlled by switches $b'$, $b^2$, $b^3$ and $b^4$, respectively lead to various destination points on the plan. These separate conductors are shown only for the connections to four destination points P, P', $P^2$ and $P^3$, but it will be understood that any desired number of destinations on the plan may be connected to the control panel. Upon closing any one of the switches $b'$, $b^2$, $b^3$ or $b^4$ according to the destination P, P', $P^2$ or $P^3$ desired, current will flow from the source S through the appropriate conductor $f'$, $f^2$, $f^3$ or $f^4$ to the selected point P, P', $P^2$ or $P^3$, respectively, along the circuit designating the preferred itinerary to the starting point O and back to the source S by way of the conductor $r$, and the itinerary OP, OP', $OP^2$ or $OP^3$ will thus be rendered visible on the plan. The interruptions or breaks for eliminating undesirable branch circuits may be arranged as desired, for example by taking account of the distances from the starting point O, one of such interruptions being indicated at $c$ between the points P' (Cluny) $P^2$ (C'Lemoine).

It is to be noted that this indicator can be constructed with a simple mounting, comprising a single electrical display device for each point or station to be marked, and a single lead between this point and the control panel, that is, for each itinerary. No relay is necessary. It is sufficient to have a single movable part or element for applying voltage by the forming the terminus of the desired itinerary, and thereby causing the itinerary as a whole to appear on the indicator to be marked, terminus of the desired itinerary.

The source of current must be adapted to furnish to each of the leads extending to the different points to be indicated a voltage appropriate to the length of the journey to be followed in order to travel from the origin point O to each of these points, the current traversing a circuit having to be substantially the same whatever be its length, on account of the series mounting of the electrical receivers.

Several solutions allow of obtaining the range of voltages appropriate to the different itineraries, for example:

In the case of a supply at constant current, the simplest solution is realized by means of a transformer having a large voltage drop; its primary is fed with alternating current at constant voltage and its secondary supplies automatically a substantially constant current when the ohmic resistance of the output circuit varies between nil and a maximum corresponding to the longest itinerary.

The arrangement of the source S and control panel M then becomes as shown diagrammatically in the single figure of the accompanying drawing, wherein T designates the transformer of which the primary winding is fed at a constant voltage and the secondary winding is connected at one end to the starting point O by the common return lead $r$ and at the other end to a bus-bar $m$ on the control panel M. Each of the conductors such as $f'$, $f^2$, $f^3$ and $f^4$ can be connected to this bus-bar by means of a suitable switch $b'$, $b^2$, $b^3$ and $b^4$, respectively.

While I have elected to describe and illustrate a constant current transformer as a means for supplying current to the several circuits, it will be understood that other means may be employed for preventing excessive current being supplied to the respective circuits, for example, I may employ a transformer having a secondary winding with multiple tappings adapted to furnish a range of constant voltages or I may utilize an ohmic resistance with multiple tappings in order to obtain the range of voltages necessary, etc.

Referring further to the accompanying drawing, I have illustrated therein, by means of relatively large circles, interchange or transfer stations where two or more transportation lines intersect and where facilities are provided for a passenger traveling on one line to change onto another line which will carry him to or toward his destination. In the said drawing I have shown chain-like lines between the point O (Ch. Elysees) and the point P (Vaneau), P' (Cluny), $P^2$ (C'Lemoine) and $P^4$ (Republique) to designate the rows of lights or other indicators, and by means of dotted lines, I have indicated various other routes constituting a part of the said transportation system, some of which routes pass through or to the various interchange or transfer stations indicated by the relatively large circles. The solid black dots shown in the drawing designate various stations along the various routes, some of which are identified by name. The starting point O has been assumed to be the station Ch. Elysees which is located only on a single transportation line which extends from the Paris station Pt. de Nevilly (not shown) through Concorde, Palais Royal, H. Deville, Bastille and on to Chateau de Vincennes (not shown). Each station is marked with a lamp or other visual indicator and the lamps or indicators of the same line or section of the line are connected in series groups. Interconnections are provided between the several conductors connecting the groups of lamps, these interconnections being located at the interchange or intersecting stations. The conductors are interrupted at appropriate points $c$, $c'$, $c^2$, etc., located between the lamps representing selected adjacent stations, these interruptors together with the suppression of interconnections at certain crossings or interchange stations, constituting the means for insuring that the current may traverse only a single predetermined path, the position of the interruptions obviously depending upon the station O selected as the starting point. The stations selected immediately to one or the other side of a single circuit interruption thus become the terminals of different journeys from the starting point, as discussed above in connection with point $P'$ (Cluny) and point $P^2$ (C'Lemoine), the two journeys being of approximately equal length of duration but following portions of different routes.

The constant current source S which is permanently connected on one pole by way of the lead $r$ to the lamp at the starting point on station O (Ch. Elysees) has its other pole connected to the bus bar $m$ of the control panel M, which panel includes switches $b'$, $b^2$, $b^3$ and $b^4$ for controlling the respective leads $f'$, $f^2$, $f^3$ and $f^4$ extending to the lamps at the stations P, P', $P^2$ and $P^3$, respectively. It will be apparent that operation of any one of the switches will illuminate all of the lamps along the line or lines representing the preferred itinerary from the starting point O to the destination corresponding to the control switch operated. While I have shown only four such control switches and a corresponding number of destination points, it will be obvious that a greater number of switches and leads may be employed to designate the preferred itinerary from the starting point O to any number of additional stations.

When considering the present invention, it is important to maintain a clear distinction between various routes available for travel within the system and the preferred itinerary which the passenger is recommended to follow in order to travel from the starting point to the selected destination. In the present specification and claims the term "route" is employed to designate an established service such as a line running from point Pt de Nevilly (not shown) through Ch. Elysees, Concorde, Palais Royal, H. Deville, Bastille, to Chateau de Vincinnes, (not shown), whereas the term "itinerary" is employed to mean the actual course of travel from a starting point to a destination, the passenger traveling along contiguous sections of different routes having interchange or transfer facilities at the crossing points, for example, from the starting point O (Ch. Elysees) in a direction toward Bastille, by changing at Palais Royal onto the interconnecting line and changing again at Bastille to a branch line running to G. de Lyon.

What I claim is:

1. An electrical itinerary finder, comprising a plan representing a transport system, electrical display devices representing on said plan a plurality of routes within said system and a plurality of individual points along said routes, a plurality of conductors connecting adjacent display devices in series, said conductors being interconnected at crossing points and interrupted between adjacent points to which substantially equivalent itineraries along portions of different routes are available from a specific starting point, a common lead to a point on one of said conductors representing a position on one of said routes adjacent to said starting point, a source of current, selective means for sending current through said common lead and along a single circuit including at least one uninterrupted portion of at least one of said conductors to one of said display devices representing a desired destination, and means for preventing excessive currents in said display devices.

2. An electrical itinerary finder, comprising a model of a transport system, a plurality of interrupted conductors in said model, each of said conductors representing an available route of travel in said system, electrical indicators connected in series groups by said interrupted conductors and located to represent individually various points along said routes of travel, said conductors being interrupted adjacent to points to which equivalent itineraries are available along portions of different routes of travel from a point representing the start of travel, a source of current, selective means for sending current from said source along portions of said conductors to contiguous groups of said electrical indicators according to a desired destination, and means for preventing excessive current in said electrical indicators, the indicators connected by the portions of said conductors receiving current indicating the preferable itinerary to said destination from said point representing the start of travel.

RÉMY FÉLIX OLIVIER LEVIN.